(12) United States Patent
Ishikawa et al.

(10) Patent No.: US 6,422,526 B1
(45) Date of Patent: Jul. 23, 2002

(54) STRUCTURE OF SUPPORT LEG MEMBER FOR SEAT SLIDE DEVICE

(75) Inventors: Takeshi Ishikawa; Masami Muraishi, both of Akishima; Yasushi Asano, Kosai, all of (JP)

(73) Assignee: Fujikiko Kabushiki Kaisha, Shizuika-ken (JP)

( * ) Notice: Subject to any disclaimer, the term of this patent is extended or adjusted under 35 U.S.C. 154(b) by 0 days.

(21) Appl. No.: 09/624,895

(22) Filed: Jul. 24, 2000

(51) Int. Cl.$^7$ ............................................... F16M 13/00
(52) U.S. Cl. ................. 248/430; 297/216.18; 296/68.1; 296/65.14
(58) Field of Search .................... 297/216.1, 216.18; 248/429, 430, 424; 296/68.1, 65.13, 65.14

(56) References Cited

U.S. PATENT DOCUMENTS

| | | | | |
|---|---|---|---|---|
| 3,204,916 A | * | 9/1965 | Pickles | 248/429 |
| 4,804,229 A | * | 2/1989 | Nishino | 297/216.1 |
| 4,881,827 A | * | 11/1989 | Borlinghaus et al. | 248/430 |
| 4,948,189 A | * | 8/1990 | Terada et al. | 248/429 |
| 4,964,608 A | * | 10/1990 | Rogala et al. | 248/429 |

FOREIGN PATENT DOCUMENTS

| | | |
|---|---|---|
| JP | 10-100745 | 4/1998 |
| JP | 10-100746 | 4/1998 |

\* cited by examiner

*Primary Examiner*—Jerry Redman
(74) *Attorney, Agent, or Firm*—Browdy and Neimark (57) ABSTRACT

A structure of support leg member having a pair of reinforcing pieces formed laterally thereof, which is used with a seat slide device provided in an automotive seat, wherein an inclinable portion is defined in the upper securing portion of the support leg member on which a guide rail of the seat slide device is securely amounted. The inclinable portion allows the guide rail to be inclined by a great load applied thereto in excess of a tolerable amount, thereby protecting the seat slide device against damage. The inclinable portion, for instance, may comprise an upward protuberant bead formed in the upper securing portion so that a pair of spacings are defined between the guide rail and a base portion of that upper securing portion such as to allow inclination of the guide towards the center of the automotive seat. Alternatively, the inclinable portion may be embodied by bending one or both of the two reinforcing pieces outwardly to render the support leg member so less rigid as to be buckled slantwise by the foregoing great load, thereby allowing inclination of the guide rail towards the center of the automotive seat.

8 Claims, 3 Drawing Sheets

STRUCTURE OF SUPPORT LEG MEMBER FOR SEAT SLIDE DEVICE

BACKGROUND OF INVENTION

1. Field of the Invention

The present invention relates to a support leg member for supportively fixing a guide rail of a seat slide device to the floor of automobile. More particularly, the invention is directed to the structure of such support leg member.

2. Description of Prior Art

Figure 1A:
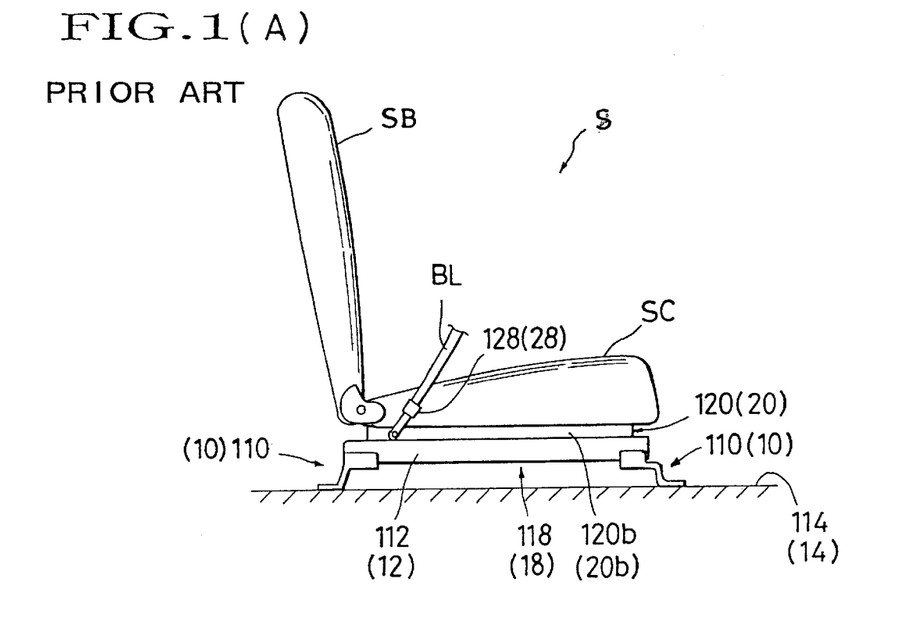
FIG. 1(A) is a schematic side view of an automotive seat provided with a seat slide device in general.
Figure 1B:
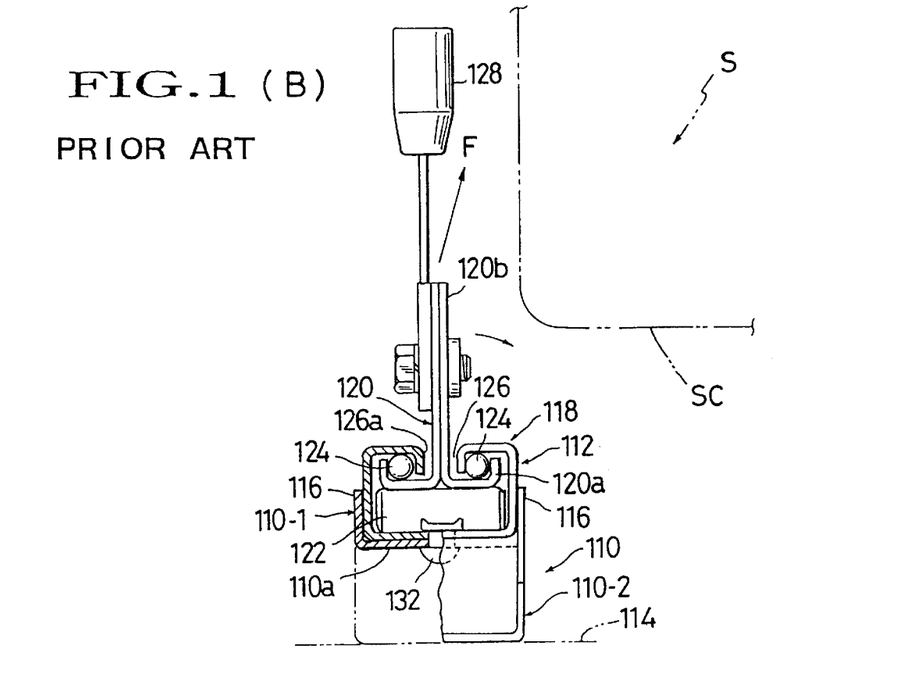
FIG. 1(B) is a partially sectioned rear elevation view showing the seat slide device and a conventional support leg member.

Most of automotive seats, such as a front seat, are provided with a seat slide device to allow for selective adjustment in position of the seat in the fore-and-aft direction thereof. As shown in FIGS. 1(A) and 1(B), a typical seat slide device, designated by (118), has a movable rail (120) (i.e. an upper rail) to be fixed on the seat cushion (SC) and a guide rail (112) (i.e. a lower rail) to be fixed on the floor (114) of automobile, wherein the movable rail (120) is sildably fitted, via rotatable elements such as rollers (122) and steel balls (124), in the lower rail member (120) such as to be movable along the longitudinal direction thereof or in the fore-and-aft direction. Designation (SB) denotes a seat back.

In this kind of seat slide device (118), the guide rail (112) has a longitudinally extending slit-like opening (126) formed in the upper wall thereof, whereas the movable rail (120) has a base portion (120a) slidably disposed within the guide rail (112) and a vertically extending portion (120b) which extends outwardly through the aforesaid opening (126) in the upward direction. To such vertically extending portion (120b), the seat cushion (SC) is securely connected via a bracket or the like. The guide rail (112) is provided with a front support leg member (110) and a rear support leg member (110) at the respective forward and rearward ends thereof in a securely fixed manner. Hence, the guide rail (112) is fixedly secured via those two leg members (110) to the floor (114).

With particular regard to the rear support leg member (110), as seen in FIG. 1(B), the well-known structure thereof is of such an offset configuration that the upper and lower securing portions (110-1) (110-2) thereof extend in a parallel direction opposite to each other with respect to the vertically bent central portion thereof, wherein all of those portions are formed integrally together. Namely, the upper securing portion (110-1) is defined at a side corresponding to the guide rail (112) and adapted for securely receiving the guide rail (112), while on the other hand, the lower securing portion (110-2) is defined at a side corresponding to the floor (114) and adapted for secure fixation thereto. In such support leg member (110), a pair of reinforcing pieces (116) are each provided at the respective right and left lateral sides thereof for the purpose of reinforcing the leg member itself and serving as a guide for allowing the guide rail (112) to be placed in position on the upper securing portion (110-1). The two reinforcing pieces (116) are formed by bending both right and left lateral regions of leg member (110) upwardly so as to erect symmetrically from the base portion (110a).

The automotive seat, in particular, a front seat, to which the foregoing slide rail device and leg members are applied (as in FIG. 1(A)), is normally equipped with a seat belt (BL). As shown in FIGS. 1(A) and 1(B), a seat belt anchor or its buckle (128) is provided for releasable connection with the seat belt (BL) and fixedly attached on the vertically extending portion (120b) of movable rail (120) associated with the seat slide device. In an emergency case or a collision, the seat belt (BL) is pulled by an excessive great load applied from an occupant on the seat (S). That is, referring to FIG. 1(B), the seat belt (BL) is strongly drawn in a direction to the center of seat (S) (i.e. in the arrow direction (F) ), with the result that a great force is caused via the buckle (128) (or seat belt anchor), which attempts to incline the movable rail (120) of the seat slide device in the same direction to the center of seat (S) (i.e. rightwards as viewed from FIG. 1(B)).

As stated earlier, the known support leg member (110) itself is normally high in rigidity due to the two reinforcing pieces (116), and thus, the guide rail (112) is firmly connected and supported thereby to the floor (114). Under such robust condition, if the excessive great load (i.e. the input load (F)) is caused, attempting to forcibly incline the movable rail (120) relative to the guide rail (112), it is highly possible that the input load (F) will be intensively exerted upon the outward edge (126a) of opeing (126) formed in the upper wall of guide rail (112).

Further, the input load (F) is transmitted to the reinforced support leg member (110), hence attempting to incline the guide rail (112) as well relative thereto. This means that a rivet (132), which connects those guidle rail and leg member together, is prone to receiving intensive exersion of the load (F), and therefore, it is more likely than not that the rivet (132) will be broken, depending on the degree of load (F) exerted thereon, which may also result in an undesried separation of the guide rail (112) from the leg member (110).

Heitherto, the above-noted problems have been solved by increasing the thickness of the the guide rail (112) to attain an increased rigidity enough to embracingly hold the movable rail (120) against the foregoing load (F) and by employing a more firmly fixing means, as by welding, to fix the the guide rail to the support leg member (110) so firmly enough to withstand the load (F), for the puprose of safety in the whole seat slide device. However, to increase the thickness of guide rail (112) will result in the guide rail itself being increased in size and weight. Also, the addition of such fixing means as welding will make more troublesome the steps of fixing the guide raild (112) to the support leg member (110). Consequently, those convnetional safety coutermeasures still require other separate elments and high costs involved, for which reason, a problem remains unsolved in the versatile and easy adaptability of support leg member for use in the seat.

SUMMARY OF THE INVENTION

In view of the above-stated drawbacks, it is a primary purpose of the present invention to provide improved structure of support leg member for use with a seat slide device, whcih is of a quite simplied structure for protecting the seat slide device against damage, without the necessity of increasing the size and weight of the guide rail of seat slide device.

To attain such purpose, according to the present inveniton, in combinatin with a seat slide device which includes a guide rail to be fixed at a side of a floor of automobile and an upper rail slidalby fitted in the guide rail, wherein a seat belt means is secruely provided at the guide rail, there is basically provided a structure of support leg member comprising:

- a first securing portion defined at a side corresponding to the guide rail, on which first securing portion, the guide rail is securely mounted;
- a second securing portion defined at a side corresponding to the floor of automobile, the second securing portion being adapted for fixation to that floor;
- the first and second securing portions being formed so integrally together as to define a base portion in each of them;

a pair of reinforcing pieces which are so formed by bending two lateral regions of those first and second securing portions upwardly that the two reinforcing pieces erect respectively from two lateral sides of said base portion; and an inclinable means defined in the base portion, which allows the support leg member to be deformed by a great load applied from said seat belt means in excess of a tolerable amount, thereby allowing inclination of the guide rail with respect to the support leg member.

Accordingly, the provision of only such inclinable means is sufficient to allow the great load to smoothly escape to the floor of automobile, thus simplifying the structure and eliminating the necessity of increasing the size and weight of the guide rail.

In one aspect of the present invention, the inclinable means may comprise an upward protuberant region or bead having a flat upper surface. This bead may be formed along a central line of the base portion of the first securing portion such as to space two lateral sides of the bead from the respective said two lateral sides of said base portion. Accordingly, there are defined a pair of spacings between a bottom wall of the guide rail and the base portion in such a manner that said pair of spacings are provided beneath the guide rail bottom wall in a symmetrical fashion relative to the central line of base portion, whereby, due to such pair of spacings, the guide rail is inclinable by the foregoing great load.

In another aspect of the invention, the inclinable means may comprise a downward protuberant region or bead formed along one lateral side of the base portion of first securing portion, which faces toward a center of said automotive seat. Thus, one spacing is defined beneath a bottom wall of said guide rail at a side facing toward the center of the automotive seat, whereby, due to such one spacing, the guide rail is inclinable by the foregoing great load.

In still another aspect of the invention, the inclinable means comprises an outward divergent fashion of said pair of reinforcing pieces, which is defined by bending them outwardly away from each other relative to said base portion so as to reduce a rigidity of said support leg member, whereby, only when the foregoing great is applied, the support leg member is buckled slantwise by the foregoing great load in at least one of two directions symmetric relative to the base portion, thereby allowing inclination of the guide rail towards a direction of the great load. Alternatively, the inclinable means may comprise an outwardly bent one of such pair of reinforcing pieces, which is defined by bending one of them outwardly relative to the base portion for the same purpose.

Other advantages and features of the present invention will become apparent from reading of the descriptions hereinafter, with reference to the annexed drawings.

DETAILED DESCRIPTION OF PREFERRED

Embodiments of the Invention

Figure 2:
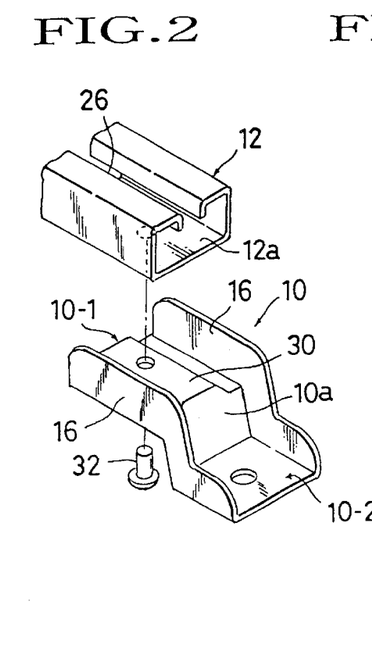
FIG. 2 is a partly broken, exploded perspective view showing a guide rail and one mode of support leg member for use with the seat slide device in accordance with the present invention.
Figure 3:
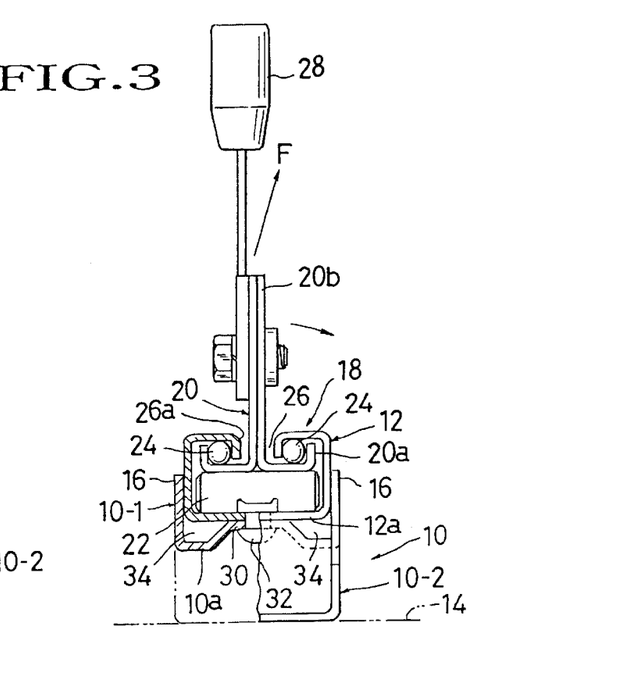
FIG. 3 is a partially sectioned rear elevation view of those seat slide device and one mode of support leg member shown in the FIG. 2 in conjunction with the FIG. 1(A)

As shown in FIGS. 2 and 3, according to the structure of support leg member for use with the seat slide device (also, see the designation (18) in FIG. 1(A)) in the present invention, the support leg member (10) is formed by bending a rigid plate material in such an offset configuration that the upper and lower securing portions (10-1) (10-2) thereof extend in a parallel direction opposite to each other with respect to the vertically bent central portion thereof. Namely, as understandable from FIGS. 1(A), 2 and 3, the upper securing portion (10-1) is defined at a side corresponding to the guide rail (12) of seat slide device (18) and adapted for securely receiving the guide rail (12), while on the other hand, the lower securing portion (10-2) is defined at a side corresponding to the floor (14) of automobile and adapted for secure fixation thereto. In such support leg member (10), a pair of reinforcing pieces (16) are each provided at the respective right and left lateral sides thereof for the purpose of reinforcing the leg member itself and serving as a guide for allowing the guide rail (12) to be placed in position on the upper securing portion (10-1). The two reinforcing pieces (16) are formed by bending both right and left lateral regions of leg member (10) upwardly so as to erect symmetrically from the base portion (10a).

In brief, with regard to the seat slide device (18) securely mounted on the present support leg member (10), the construction thereof may be such that a movable rail (20) (i.e. an upper rail) is sildably fitted, via rotatable elements such as rollers (22) and steel balls (24), in a guide rail (12) (i.e. a lower rail) such as to be movable along the longitudinal direction thereof or in the fore-and-aft direction.

In that sort of seat slide device (18), the guide rail (12) is so formed to have an inner hollow therein (see FIG. 3) and a longitudinally extending slit-like opening (26) formed in the upper wall thereof, whereas the movable rail (20) has a lower base portion (20a) slidably disposed within such inner hollow of guide rail (12) and a vertically extending portion (20b) which extends outwardly through the aforesaid opening (26) in the upward direction. To such vertically extending portion (20b), the seat cushion (SC) is securely connected via a bracket or the like (as in FIG. 1(B)). The guide rail (12) is provided with a forward support leg member (10) and a rearward support leg member (10) at the respective forward and rearward ends thereof in a securely fixed manner. Via those two support leg members, the guide rail (12) is firmly fixed on the floor (14).

Since this seat slide device (18) is of a known construction and not a subject matter of the present invention, any further detailed description thereon is omitted.

As with ordinary support leg members, the rearward support leg member (10) having the illustrated offset configuration, as noted above, is normally fixed to the rearward end of the guide rail (12). On the other hand, the forward support leg member (10) is normally of a generally "L" shape in the longitudinal section as in FIG. 1(A). By the combination of those forward and rearward support leg members (10), the guide rail (12) is fixedly secured on the floor (14).

As shown in FIG. 2, a seat belt anchor or its buckle (28) is provided for releasable connection with an engagement end (tongue) of seat belt (at BL in FIG. 1(A)) and fixedly attached on the vertically extending portion (20b) of movable rail (20) associated with the seat slide device (18). In an emergency case such as a collision, a great load occurs in excess of a tolerable amount at which the seat belt device withstands the corresponding impact. Such excessive great load will be input or applied through the seat belt anchor (28) to the seat slide device. In that case, referring to FIGS. 1(A) and 3, the seat belt (BL) is strongly drawn in the upward slantwise direction toward the center of seat (S) (i.e. in the arrow direction (F)), with the result that a great force is caused via the buckle (28) (i.e. seat belt anchor), which attempts to incline the movable rail (20) of the seat slide device in the same direction to the center of seat (S) (i.e. rightwards as viewed from FIG. 3).

In accordance with the present invention, as can be seen from FIGS. 2 and 3, an upward protuberant region or an upward protuberant bead (30) is formed in the upper securing portion (10-1) of support leg member (10) such as to extend along a central line in the base portion (10a) of that upper securing portion (10-1), so that a pair of recessed areas are defined on the opposite sides of the bead (30) to thereby space both lateral sides of bead itself from the respective right and left sides of support leg member (10). The bead (30) has a flat upper surface for carrying the guide rail (12) thereon. The guide rail (12) is firmly fastened on that flat upper surface of bead (3) by means of a rivet (32) having been depressed, for instance. With this formation, as viewed from FIG. 3, a pair of spacings (at 34) are provided between the bottom wall (12a) of guide rail (12) and the base portion (10a) of upper securing portion (10-1), such that those two spacings are defined symmetrically relative to and on the opposite lateral areas of the guide rail bottom wall (12a). It is noted that both two spacings constitute an inclinable means (34) for allowing the guide rail (12) to be inclinable with respect to the support leg member (10). Namely, in the case where a great load input in excess of a tolerable amount, i.e. the excessive great load (at F) caused in an emergency case as mentioned earlier, is applied to the guide rail (12), then the inclinable means (34) or one of the foregoing two spacings will permit the guide rail (12) to be inclined thereto by the load.

Figure 4:
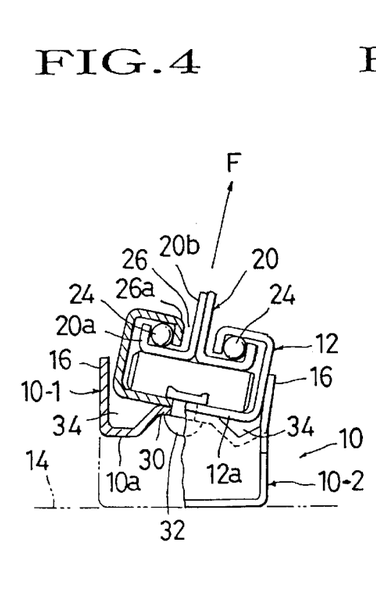
FIG. 4 is a partly broken and partially sectioned rear elevation view similar to the FIG. 3, which shows the state where a great load is applied to such one mode of support leg member.

By virtue of such arrangement, the excessive great load (at F) in the emergency case, which is applied from the seat belt anchor (28) to the movable rail (20), tends to be intensively exerted upon the bead (30) which forms an irregular or deformed point in the upper securing portion (10-1) of support leg member (10). In this respect, the bead (30) is inherently provided with a pair of bent foot portions, each being integrally joined with the base portion (10a) of support leg member (10) as understandable from FIG. 3, wherein it is noted that those two particular bent foot portions are easily deformable in comparison with other portions of the same bead (30). Accordingly, as shown in FIG. 4, upon the excessive load being input or applied to the guide rail (12), the two bent foot portions of bead (30) are first deformed and then the guide rail (12) is inclined owing to the above-stated two spacings (at 34), so that the entirety of seat slide device (18) is inclined in the direction to the center of seat (S) as understandable from the FIG. 4 in conjunction with FIGS. 1(A) and 1(B).

With this inclination of seat slide device (18), it is to be appreciated that the direction of the thus-input excessive great load (i.e. in the arrow direction (F)) substantially coincides with a direction perpendicular with the guide rail (12) and the flat upper surface of bead (30), thereby insuring to avoid any intensive exertion of the load upon the outward edge (26a) of opening (26) or upon the rivet (32). At the same time, many load transmission passages are created in both of the seat slide device (18) and support leg member (10), which effectively allow most of the load to escape completely therethrough to the floor (14). In other words, the load being input from the seat belt anchor (28) is smoothly escaped through the movable and guide rails (20) (12) as well as the leg member (10) down to the floor (14), thus insuring to avoid any deformation of the guide rail (12) and any breakage of the rivet (32). Accordingly, a far-improved protective effect is given to the guide rail (12) or the seat slide device (18) against damage thereof in the case of emergency.

Further, in the present embodiment, it is sufficient to form only one bead (30) in the upper securing portion (10-1) of support leg member (10). There is thus eliminated the necessity of increasing the size and weight of the guide rail (12) and therefore, a simplified structure is attained in the support leg member, which reduces the costs for its assembly and does not require any intricate design. This also renders the support leg member (10) adaptable for versatile use with the wide ranges of seat slide devices while offering the same excellent protective effect as discussed above.

Still further, in the present embodiment, despite the excessive great load (at F) applied to the seat slide device (18), deformation is only caused in the support leg member (10), which automatically inclines the whole of seat slide device (18), without its damage, toward the center of seat (S), so that the seat slide device itself remains workable for allowing fore-and-aft movement of the seat. Therefore, even if the great load occurs in the emergency case such as a collision, deforming the support leg member (10), one can easily slide and move the seat to a proper position allowing a driver or passenger involved in the accident to be escaped and rescued from the automobile. Hence, in this mode of the present invention, the rescue activity can be readily conducted.

Figure 5:
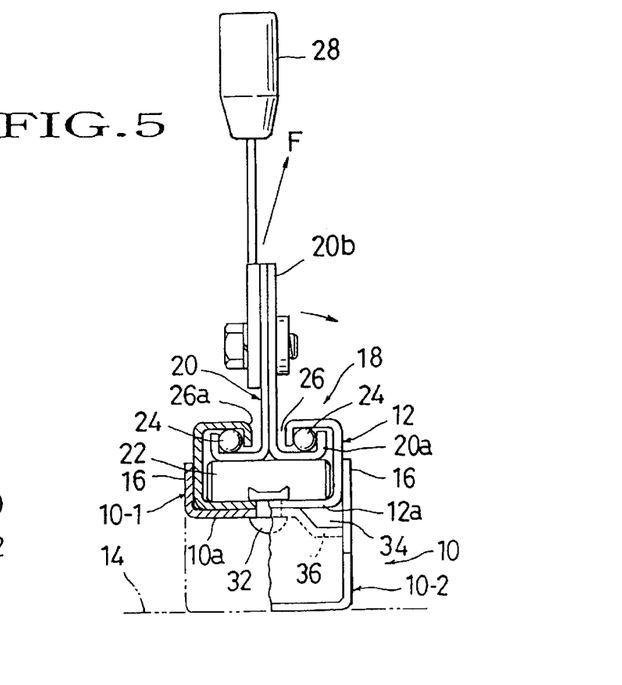
FIG. 5 is a partially sectioned rear elevation view showing the seat slide device and another mode of support leg member in accordance with the present invention.

While the embodiment hereinbefore relates to the formation of bead (30) and inclinable means (34), i.e. the pair of spacings provided between that bead (30) and the guide rail bottom wall (12a), the present invention is not necessarily restricted thereto, but may be embodied by the mode of FIG. 5 wherein a downward protuberant region or downward protuberant bead (36) is formed in one lateral side of the upper securing portion (10-1) of support leg member (10), in view of the fact that it is sufficient to only allow the inclination of the guide rail (12) or the seat slide device (18) in one direction of the load input from the seat belt (BL) (i.e. in the arrow direction (F)) which corresponds to the direction toward the center of seat (S). Specifically, as in FIG. 5, the downward protuberant bead (36) is formed in the base portion (10a) of upper securing portion (10-1) in such a manner that the bead is defined in one lateral side of the base portion (10a) which faces toward the center of seat (S) as understandable from the FIG. 5 in conjunction with FIGS. 1(A) and 1(B). With this arrangement, the guide rail (12) is securely mounted on the upper surface area of base portion (10a) excluding the bead (36), whereupon there is defined only one spacing (at 34) beneath the bottom wall (12a) of guide rail (12) at the side facing towards the center of seat, thereby allowing the guide rail (12) to be inclinable in the direction to the center of seat.

Accordingly, in this particular second embodiment, the bead (36) is inherently provided with a bent portion jointed integrally with the base portion (10a) and thus it follows that an excessive great load (at F) input from the seat belt is intensively exerted on that bent portion of bead (36), causing deformation of the same, as a result of which, the spacing (at 34) allows the seat slide device (18) to be inclined assuredly in a direction corresponding to the direction of the load. Likewise as in the foregoing first embodiment, this alternative second embodiment also achieves the same excellent protective effect as discussed above for the seat slide device and renders the support leg member adaptable for versatile use with the wide ranges of seat slide devices.

Figures 6, 7, 8:
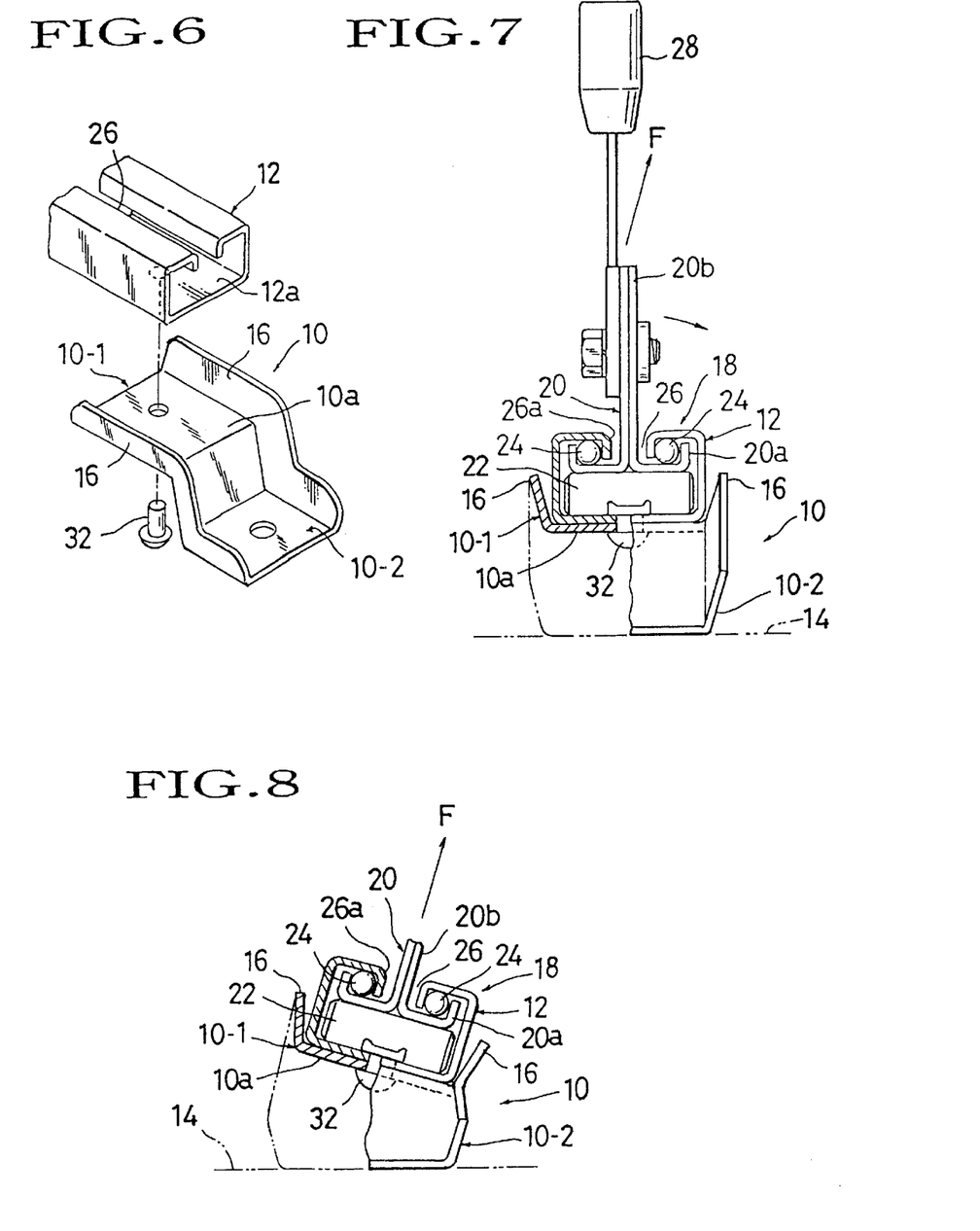
FIG. 6 is a partly broken, exploded perspective view showing the guide rail and still another mode of support leg member in accordance with the present invention.
FIG. 7 is a partially sectioned rear elevation view showing those seat slide device and still another mode of support leg member shown in the FIG. 6 in conjunction with the FIG. 1(A)
FIG. 8 is a partly broken and partially sectioned rear elevation view similar to the FIG. 7, which shows the state where a great load is applied to such still another mode of support leg member.

Reference is made to FIGS. 6 to 8 which shows another alternative third embodiment of the present invention.

In the aforementioned first and second embodiments, the two reinforcing pieces (16), formed symmetrically relative to the support leg member base portion (10a), are in the state of extending upwardly or erecting perpendicularly therefrom for the purpose of maximizing its reinforcement to the support leg member (10). By contrast, in the present third embodiment, the inventors have noticed the fact that the widening or diverging of both two reinforcing pieces (16) outwardly in relation to the base portion (10a) will reduce the reinforcement degree of those pieces (16) themselves to the support leg member (10). Based on this finding, the two reinforcing pieces (16) are bent outwardly away from each other as shown in FIGS. 6 and 7, i.e. in the outward divergent fashion relative to the base portion (10a), so as to reduce the rigidity of support leg member (10).

Otherwise stated, in this embodiment, such outwardly diverged reinforcing pieces (16) constitute an inclinable means equivalent to that (34) of the foregoing first and second embodiments. For, the support leg member (10) per se is reduced in rigidity due to such outward divergent fashion of reinforcing pieces (16), which effectively allows a downward slantwise deformation or slantwise buckling of the leg member (10) in at least one of the rightward and leftward directions symmetric relative thereto only when the excessive great load input from the seat belt anchor (28), i.e. the load in excess of a tolerable amount as stated previously, is applied to the movable rail (20) in the corresponding direction in the case of emergency. That is, as can be seen from FIGS. 7 and 8, if the excessive great load is input in the arrow direction (F), the support leg member (10) is deformed or buckled slantwise in the same direction therewith towards the center of seat (S) (i.e. rightwards as viewed from FIG. 8). This slantwise buckling in turn causes simultaneous inclination of the guide rail (12) or the entirety of seat slide device (18) in the same direction with the input direction of load.

With such arrangement, in the emergency case, the excessive great toad (at F), applied from the seat belt anchor (28) to the movable rail (20), causes slantwise buckling of the support leg member (10), which in turn causes inclination of its upper securing portion (10-1), with the result that the guide rail (12) or the whole of seat slide device (18) is also inclined in the direction to the center of seat (S), as understandable from FIG. 8 in conjunction with FIGS. 1(A) and 1(B).

With the inclination of seat slide device (18), it is to be appreciated that the direction of the thus-input excessive great load (i.e. in the arrow direction (F)) substantially coincides with a direction perpendicular with the guide rail (12) and the base portion (10a) of upper securing portion (10-1) which forms a plane for securing the guide rail (12), thereby insuring to avoid any intensive exertion of the load upon the outward edge (26a) of opening (26) or upon the rivet (32). At the same time, many load transmission passages are created in both of the seat slide device (18) and support leg member (10), which effectively allow most of the load (F) to escape completely therethrough to the floor (14). In other words, the load being input from the seat belt anchor (28) is smoothly escaped through the movable and guide rails (20) (12) as well as the leg member (10) down to the floor (14), thus insuring to avoid any deformation of the guide rail (12) and any breakage of the rivet (32). Accordingly, a far-improved protective effect is given to the guide rail (12) or the seat slide device (18) against damage thereof in the case of emergency.

Further, in the present third embodiment, it is sufficient to only bend the two reinforcing pieces (16) in the outward divergent fashion relative to the support leg member (10). There is thus eliminated the necessity of increasing the size and weight of the guide rail (12), so that a simplified structure is attained in the support leg member, which reduces the costs for its assembly and does not require any intricate design. The support leg member itself is therefore made adaptable for versatile use with the wide ranges of seat slide devices while offering the same excellent protective effect as discussed above.

Such simply bending of two reinforcing pieces (16) in the outward divergent fashion means that they are inclined by a predetermined angle from their respective two foot base portions which are each confined to and formed integrally with the respective two lateral sides of the base portion (10a) of support leg member (10). Hence, the width between those two foot base portions remains equal to the width of the base portion (10a), whereby the guide rail (12) can be fit and supportively sandwiched between the two foot base portions respectively of the two reinforcing pieces (16). This retains the inherent function of the reinforcing pieces (16) to serve as a guide for allowing the guide rail (12) to be placed in position on the upper securing portion (10-1). Accordingly, with the present mode of support leg member, a worker can readily secure the support leg member to the seat slide device, thereby maintaining a smooth run of the assembling. Also, the support leg member itself is made adaptable for versatile use with the wide ranges of seat slide devices while offering the same excellent protective effect as discussed above.

Still further, in this third embodiment, despite the excessive great load (at F) applied to the seat slide device (18), only the support leg member (10) is subjected to the downward slantwise deformation or buckling as noted above, which automatically inclines the whole of seat slide device (18) toward the center of seat, without any damage thereto, so that the seat slide device itself remains workable for allowing the fore-and-aft movement of seat. Therefore, even if the great load occurs in the emergency case such as a collision, deforming the support leg member, one can easily slide and move the seat to a proper position allowing a driver or passenger involved in the accident to be escaped and rescued from the automobile. In this mode of the present invention, the rescue activity can also be readily conducted.

The present embodiment shows both two reinforcing pieces (16) as being bent in the outward divergent fashion relative to the base portion (10a), but it is possible, within the scopes of the present invention, to only bend one of the two reinforcing pieces (16) outwardly. Namely, it is optionally possible to only bend one reinforcing piece (16) situated in one lateral side of the upper securing portion (10-1) facing toward the center of seat, such as to render that particular portion less rigid for the above-mentioned slantwise buckling purpose. For, it is sufficient to only allow the inclination of the guide rail (12) or the seat slide device (18) in one direction of the load input from the seat belt (BL) (i.e. the arrow direction (F) as understandable from both FIGS. 1(A), 1(B) and 8) which corresponds to the direction toward the center of seat (S).

With this alternative mode, upon the excessive great load (at F) applied to the seat slide device, the support leg member (10) is buckled slantwise at that one bent reinforcing piece (16), thus positively inclining the seat slide device (18) in the input direction of load corresponding to the direction toward the center of seat. Likewise as in the foregoing embodiments, this alternative mode also attains the same excellent protective effect as discussed above for the seat slide device and renders the support leg member adaptable for versatile use with the wide ranges of seat slide devices.

While the descriptions made hereinbefore are dedicated only to the rearward support leg member (10), it is needless to mention that all the foregoing embodiments may be applied to the forward leg member fixedly provided at the forward end of seat slide device, as well.

Indeed, the structure of support leg member thus described in the present invention is effectively suited for a seat slide device of an automotive seat, in particular for a seat slide device provided in a front seat. But, this is not limitative, and the support leg member structure of the present invention may be applied sufficiently to other kinds of vehicle seats, such as a rear seat of automobile or a seat of airplane, insofar as they are equipped with a seat slide device having a seat belt anchor fixed thereon.

It should be understood that all the above-elaborated embodiments are intended only for clarifying the inventive concept of the present invention, and do not limit the invention to those embodiments, and that any other modifications, replacements and additions are structurally possible within the gist of the present invention and without departing from the scopes of the appended claims.

As appreciated from the descriptions above, in accordance with the structure of support leg member of the present invention, the provision of the inclinable means (34) is effective in allowing the seat slide device to be easily and positively inclined by the excessive great load (at F) in the direction of the latter, and therefore, the input direction of excessive great load (at F) substantially coincides with a direction perpendicular with the guide rail and the upper securing portion of support leg member on which the guide rail is secured, thereby insuring to avoid any intensive exertion of the load upon the outward edge (26a) of opening (26) or upon the rivet (32). Consequently, since it is possible with this arrangement to insure not only preventing the guide rail against deformation, but also preventing the rivet against breakage, there is achieved a far-improved protective effect in the guide rail or in the seat slide device against damage thereof in the case of emergency.

Further, according to the first and second embodiments of the invention, it is sufficient to form only one bead (30 or 36) in the upper securing portion (10-1) of support leg member (10), which eliminates the necessity of increasing the size and weight of the guide rail and simplifies the structure of support leg member. This allows the support leg member itself to be made adaptable for versatile use with the wide ranges of seat slide devices while offering the same excellent protective effect as discussed above.

Moreover, in those first and second embodiments, despite the excessive great load (at F) applied to the seat slide device, deformation is only caused in the support leg member, which automatically inclines the whole of seat slide device toward the center of seat without any damage thereto, so that the seat slide device itself remains workable for allowing the fore-and-aft movement of seat. Therefore, even if the great load occurs in the emergency case such as a collision, deforming the support leg member, one can easily slide and move the seat to a proper position allowing a driver or passenger involved in the accident to be escaped and rescued from the automobile.

Still further, according to the third embodiments of the invention, it is sufficient to simply bend both two reinforcing pieces (16) in the outward divergent fashion or to simply bend one of them outwardly, which eliminates the necessity of increasing the size and weight of the guide rail and simplifies the structure of support leg member. This not only allows the support leg member itself to be made adaptable for versatile use with the wide ranges of seat slide devices while offering the same excellent protective effect as discussed above, but also retains the inherent function of reinforcing pieces to serve as a guide for allowing the guide rail to be placed in position on the upper securing portion of support leg member. Accordingly, with the present mode of support leg member, a worker can readily secure the support leg member to the seat slide device, thereby maintaining a smooth run of the assembling. In this case also, when the excessive great load (at F) occurs, only the support leg member is subjected to the slantwise buckling as described previously, which automatically inclines the whole of seat slide device, without its damage, toward the center of seat, so that the seat slide device itself remains workable for allowing the fore-and-aft movement of seat.

What is claimed is:

1. In combination with a seat slide device provided on an automotive seat, which includes a guide rail to be fixed at a side of a floor of an automobile and an upper rail slidably fitted in the guide rail, wherein a seat belt means is securely provided at the upper rail, a structure of a support leg member comprising:
    a first securing portion defined at a side corresponding to said guide rail, said guide rail being securely mounted on said first securing portion;
    a second securing portion defined at a side corresponding to said floor of said automobile, said second securing portion being adapted for fixation to the floor of said automobile;
    said first and second securing portions being formed integrally together such as to define a first base portion in the first securing portion and a second base portion in the second securing portion;
    a pair of reinforcing pieces which are formed by bending two lateral regions of said first and second securing portions upwardly so that said pair of reinforcing pieces project respectively from two lateral sides of said first base portion and said second base portion;
    wherein said first securing portion has means for deforming so that the support leg member is deformed by a great load applied from said seat belt means in excess of a tolerable amount and inclines said guide rail with respect to the support leg member;

wherein said means for deforming comprises an outward divergence of said pair of reinforcing pieces of said first securing portion, said outward divergence of said pair of reinforcing pieces being defined by bending said pair of reinforcing pieces away from each other outwardly relative to said first base portion, thereby reducing a rigidity of said support leg member, whereby, only when said great load is applied, the support leg member is buckled slantwise in at least one of two directions symmetric relative to said first base portion, thereby inclining said guide rail in said at least one of two directions which corresponds to a direction in which the great load is applied from the seat belt means.

2. In combination with a seat slide device provided on an automotive seat, which includes a guide rail to be fixed at a side of a floor of an automobile and an upper rail slidably fitted in the guide rail, wherein a seat belt means is securely provided at the upper rail, a structure of a support leg member comprising:
a first securing portion defined at a side corresponding to said guide rail, said guide rail being securely mounted on said first securing portion;
a second securing portion defined at a side corresponding to said floor of said automobile, said second securing portion being adapted for fixation to the floor of said automobile;
said first and second securing portions being formed integrally together such as to define a first base portion in the first securing portion and a second base portion in the second securing portion;
a pair of reinforcing pieces which are formed by bending two lateral regions of said first and second securing portions upwardly so that said pair of reinforcing pieces project respectively from two lateral sides of said first base portion and said second base portion;
wherein said first securing portion has means for deforming so that the support leg member is deformed by a great load applied from said seat belt means in excess of a tolerable amount and inclines said guide rail with respect to the support leg member;
wherein one of said pair of reinforcing pieces of said first securing portion is disposed at a side facing toward a center of said automotive seat, wherein said one of said pair of reinforcing pieces is bent outwardly relative to said first base portion, thereby providing one outwardly bent reinforcing piece so as to reduce a rigidity of said support leg member at said side, and
wherein said means for deforming comprises said one outwardly bent reinforcing piece, so that, only when said great load is applied, the support leg member is buckled slantwise towards said outwardly bent reinforcing piece, thereby inclining said guide rail in a direction to said center of the automotive seat.

3. In combination with a seat slide device provided on an automotive seat, which includes a guide rail to be fixed at a side of a floor of an automobile and an upper rail slidably fitted in the guide rail, wherein a seat belt means is securely provided at the upper rail, a structure of a support leg member comprising:
a first securing portion defined at a side corresponding to said guide rail, said guide rail being securely mounted on said first securing portion;
a second securing portion defined at a side corresponding to said floor of said automobile, said second securing portion being adapted for fixation to the floor of said automobile;
said first and second securing portions being formed integrally together such as to define a first base portion in the first securing portion and a second base portion in the second securing portion;
a pair of reinforcing pieces which are formed by bending two lateral regions of said first and second securing portions upwardly so that said pair of reinforcing pieces project respectively from two lateral sides of said first base portion and said second base portion;
wherein said first securing portion has means for deforming so that the support leg member is deformed by a great load applied from said seat belt means in excess of a tolerable amount and inclines said guide rail with respect to the support leg member;
wherein said means for deforming comprises an upward protuberant region or bead having a flat upper surface which extends along a longitudinal direction of said guide rail,
wherein said upward protuberant bead is formed along a central line of said first base portion such as to space two lateral sides of said upward protuberant beam from the respective said two lateral sides of said first base portion, and wherein said guide rail is securely mounted on the flat upper surface of said upward protuberant bead, thereby defining a pair of spacings between a bottom wall of the guide rail and the first base portion in such a manner that said pair of spacings are provided beneath said bottom wall of the guide rail in a symmetrical fashion relative to said central line of the first base portion, so that, due to said pair of spacings, said guide rail is inclined by said great load.

4. In combination with a seat slide device provided on an automotive seat, which includes a guide rail to be fixed at a side of a floor of an automobile and an upper rail slidably fitted in the guide rail, wherein a seat belt means is securely provided at the upper rail, a structure of a support leg member comprising:
a first securing portion defined at a side corresponding to said guide rail, said guide rail being securely mounted on said first securing portion;
a second securing portion defined at a side corresponding to said floor of said automobile, said second securing portion being adapted for fixation to the floor of said automobile;
said first and second securing portions being formed integrally together such as to define a first base portion in the first securing portion and a second base portion in the second securing portion;
a pair of reinforcing pieces which are formed by bending two lateral regions of said first and second securing portions upwardly so that said pair of reinforcing pieces project respectively from two lateral sides of said first base portion and said second base portion;
wherein said first securing portion has means for deforming so that the support leg member is deformed by a great load applied from said seat belt means in excess of a tolerable amount and inclines said guide rail with respect to the support leg member;
wherein said means for deforming comprises a downward protuberant region or bead extending along a longitudinal direction of said guide rail, and wherein said downward protuberant bead is formed along one lateral side of said first base portion, said one lateral side facing toward a center of said automotive seat, and wherein said guide rail is securely mounted on an upper surface area of said first base portion, excluding said downward protuberant region or bead, thereby defining a space beneath a bottom wall of said guide rail at a side facing toward the center of the automotive seat, so that said spacing allows said guide rail to be inclined by said great load.

5. In combination with a seat slide device provided on an automotive seat, which includes a guide rail to be fixed at a side of a floor of an automobile and an upper rail slidably fitted in the guide rail, wherein a seat belt means is securely provided at the upper rail, a structure of a support leg member comprising:
   a first securing portion defined at a side corresponding to said guide rail, said guide rail being securely mounted on said first securing portion;
   a second securing portion defined at a side corresponding to said floor of said automobile, said second securing portion being adapted for fixation to the floor of said automobile;
   said first and second securing portions being formed integrally together such as to define a first base portion in the first securing portion and a second base portion in the second securing portion;
   wherein said first securing portion is deformable so that the support leg member is deformed by a great load applied from said seat belt means in excess of a tolerable amount and inclines said guide rail with respect to the support leg member;
   wherein said first securing portion is deformable due to an upward protuberant region or bead having a flat upper surface which extends along a longitudinal direction of said guide rail,
   wherein said upward protuberant bead is formed along a central line of said first base portion such as to space two lateral sides of said upward protuberant beam from the respective said two lateral sides of said first base portion, and wherein said guide rail is securely mounted on the flat upper surface of said upward protuberant bead, thereby defining a pair of spacings between a bottom wall of the guide rail and the first base portion in such a manner that said pair of spacings are provided beneath said bottom wall of the guide rail in a symmetrical fashion relative to said central line of the first base portion, so that, due to said pair of spacings, said guide rail is inclined by said great load.

6. In combination with a seat slide device provided on an automotive seat, which includes a guide rail to be fixed at a side of a floor of an automobile and an upper rail slidably fitted in the guide rail, wherein a seat belt means is securely provided at the upper rail, a structure of a support leg member comprising:
   a first securing portion defined at a side corresponding to said guide rail, said guide rail being securely mounted on said first securing portion;
   a second securing portion defined at a side corresponding to said floor of said automobile, said second securing portion being adapted for fixation to the floor of said automobile;
   said first and second securing portions being formed integrally together such as to define a first base portion in the first securing portion and a second base portion in the second securing portion;
   wherein said first securing portion is deformable so that the support leg member is deformed by a great load applied from said seat belt means in excess of a tolerable amount and inclines said guide rail with respect to the support leg member;
   wherein said first securing portion is deformable due to a downward protuberant region or bead extending along a longitudinal direction of said guide rail, wherein said downward protuberant bead is formed along one lateral side of said first base portion, said one lateral side facing toward a center of said automotive seat, and wherein said guide rail is securely mounted on an upper surface area of said first base portion, excluding said downward protuberant region or bead, thereby defining a space beneath a bottom wall of said guide rail at a side facing toward the center of the automotive seat, so that said spacing allows said guide rail to be inclined by said great load.

7. In combination with a seat slide device provided on an automotive seat, which includes a guide rail to be fixed at a side of a floor of an automobile and an upper rail slidably fitted in the guide rail, wherein a seat belt means is securely provided at the upper rail, a structure of a support leg member comprising:
   a first securing portion defined at a side corresponding to said guide rail, said guide rail being securely mounted on said first securing portion;
   a second securing portion defined at a side corresponding to said floor of said automobile, said second securing portion being adapted for fixation to the floor of said automobile;
   said first and second securing portions being formed integrally together such as to define a first base portion in the first securing portion and a second base portion in the second securing portion;
   wherein said first securing portion is deformable so that the support leg member is deformed by a great load applied from said seat belt means in excess of a tolerable amount and inclines said guide rail with respect to the support leg member;
   a pair of reinforcing pieces which are formed by bending two lateral regions of said first and second securing portions upwardly so that said pair of reinforcing pieces project respectively from two lateral sides of said first base portion and said second base portion;
   wherein said first securing portion is deformable due to an outward divergence of said pair of reinforcing pieces of said first securing portion, said outward divergence of said pair of reinforcing pieces being defined by bending said pair of reinforcing pieces away from each other outwardly relative to said first base portion, thereby reducing a rigidity of said support leg member, whereby, only when said great load is applied, the support leg member is buckled slantwise in at least one of two directions symmetric relative to said first base portion, thereby inclining said guide rail in said at least one of two directions which corresponds to a direction in which the great load is applied from the seat means.

8. In combination with a seat slide device provided on an automotive seat, which includes a guide rail to be fixed at a side of a floor of an automobile and an upper rail slidably fitted in the guide rail, wherein a seat belt means is securely provided at the upper rail, a structure of a support leg member comprising:
- a first securing portion defined at a side corresponding to said guide rail, said guide rail being securely mounted on said first securing portion;
- a second securing portion defined at a side corresponding to said floor of said automobile, said second securing portion being adapted for fixation to the floor of said automobile;
- said first and second securing portions being formed integrally together such as to define a first base portion in the first securing portion and a second base portion in the second securing portion;
- wherein said first securing portion is deformable so that the support leg member is deformed by a great load applied from said seat belt means in excess of a tolerable amount and inclines said guide rail with respect to the support leg member;
- a pair of reinforcing pieces which are formed by bending two lateral regions of said first and second securing portions upwardly so that said pair of reinforcing pieces project respectively from two lateral sides of said first base portion and said second base portion;
- wherein one of said pair of reinforcing pieces of said first securing portion is disposed at a side facing toward a center of said automotive seat, and
- wherein said one of said pair of reinforcing pieces is bent outwardly relative to said first base portion, thereby providing one outwardly bent reinforcing piece so as to reduce a rigidity of said support leg member at said side, and wherein said means for deforming comprises said one outwardly bent reinforcing piece, so that, only when said great load is applied, the support leg member is buckled slantwise towards said outwardly bent reinforcing piece, thereby inclining said guide rail in a direction to said center of the automotive seat.

* * * * *

UNITED STATES PATENT AND TRADEMARK OFFICE
CERTIFICATE OF CORRECTION

PATENT NO. : 6,422,526 B1
DATED : July 23, 2002
INVENTOR(S) : Takeshi Ishikawa, Masami Muraishi and Yasushi Asano It is certified that error appears in the above-identified patent and that said Letters Patent is hereby corrected as shown below:

<u>Title page,</u>
Item [73], Assignee, before "Fujikiko" insert -- Tachi-S Co. Ltd., Tokyo (JP), --

Signed and Sealed this

Thirtieth Day of March, 2004

JON W. DUDAS
*Acting Director of the United States Patent and Trademark Office*